3,274,000
ELECTROPHOTOGRAPHIC MATERIAL AND METHOD

Robert Joseph Noe, Marcel Jan Libeer, and Jean Marie Nys, Mortsel-Antwerp, Belgium, assignors to Gevaert Photo-Producten N.V., Mortsel, Belgium, a Belgian company
No Drawing. Filed Jan. 19, 1965, Ser. No. 426,681
Claims priority, application Belgium, Feb. 19, 1960, 39,580
19 Claims. (Cl. 96—1.5)

The present invention is a continuation-in-part application of our U.S. patent application Serial No. 101,612 filed February 15, 1961, now abandoned.

This invention relates to an electrophotographic reproduction process wherein an image-wise pattern of electrostatic charges is produced on a photoconductive member starting from an electromagnetic radiation image and to an electrophotographic material for such process, more particularly an electrophotographic material comprising an electro-conductive support having on at least one of its sides a photoconductive layer comprising an organic photoconductive substance.

Electrophotographic materials are known which consist of a support and a photoconductive layer containing as photoconductors an inorganic substance such as selenium and zinc oxide or an organic substance such as anthracene, benzidine and a heterocyclic compound of a particular type. The phenomenon of photoconductivity has also been observed in some triphenylmethane dyes (see R. C. Nelson, "The Photoconductivity of some Triphenylmethane Dyes" (Letters to the Editor), J. Chem. Phys., vol. 19, p. 798, June 1951).

Now we have found that some leucobases, from which corresponding dye salts can be prepared by oxidation and an acidic treatment, are suitable photoconductors for use in an electrophotographic material.

More particularly we have found that an electrophotographic material having a transparent and practically colorless photoconductive recording layer can be prepared by using as photoconductor a leucobase compound of a polyarylmethane dye salt or thiazine salt. Leucobases which are very well suitable for use in the material and method according to the present invention correspond to one of the following general formulae:

(I)
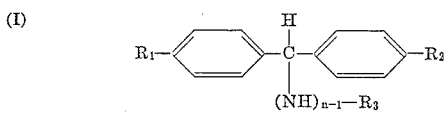

and (II)
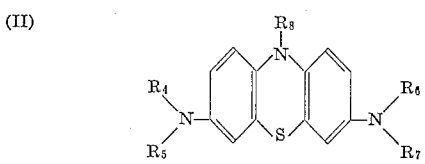

wherein:
each of $R_1$ and $R_2$ represents a member selected from the group consisting of hydroxyl, an alkoxy radical and an amino group e.g. a dialkyl amino group, $R_3$ is a member selected from the group consisting of hydrogen, hydroxyl, a heterocyclic radical and an aryl radical, e.g. phenyl, halogen-substituted phenyl, halogen and o-methyl-substituted phenyl, p-amino-substituted phenyl, halogen and p-amino-substituted phenyl, p-dialkyl amino-substituted phenyl, halogen and p-dialkylamino - substituted phenyl, p - alkoxy-substituted phenyl, and halogen and p-alkoxy-substituted phenyl, each of $R_4$, $R_5$, $R_6$ and $R_7$ represents a member selected from the group consisting of hydrogen and lower alkyl e.g. methyl or ethyl, $R_8$ represents a member selected from the group consisting of hydrogen and a benzoyl group e.g. nitro-substituted benzoyl or halogen-substituted benzoyl, and $n$ is an integer from 1 to 2.

The suitability of leucobase compounds for being applied as photoconductor in electrophotographic applications was unexpected, when considering the great difference in electronic structure of the leucobases as compared with the corresponding dye salts, and unobvious when taking into account that a relation had been found between the ionic structure of triphenyl methane dye salts and the photoconductivity of these salts (see R. C. Nelson, "An Effect of the Anion on the Conductive Properties of Triphenyl methane Dye Salts"—Letters to the Editor—J. Chem. Phys., vol. 20, August 1952).

According to a preferred embodiment of the invention the electrophotographic material comprises an electroconductive support coated at one side with a photoconductive layer which substantially consists of at least one leucobase compound corresponding to one of the above general Formulae I and II. For practical purposes the leucobase compounds are normally used in combination with a binder.

For preparing a transparent electrophotographic material a transparent electroconductive support and a leuchobase which is compatible with the binder of the photoconductive layer can be used.

The photoconductive leucobases can also be used for preparing opaque photoconductive layers wherein the leucobases are finely dispersed in a binder.

Some compounds according to the above formulae which seem to be particularly suitable for the manufacture of the electrophotographic material according to the present invention are given hereinafter in Table A.

TABLE A (I) 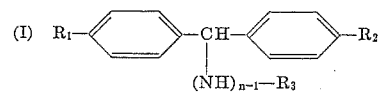

| | $R_1$ | $R_2$ | $R_3$ | $n$ |
|---|---|---|---|---|
| 1 | $N(CH_3)_2$ | $N(CH_3)_2$ | H | 1 |
| 2 | $N(CH_3)_2$ | $N(CH_3)_2$ | OH | 1 |
| 3 | $NH_2$ | $NH_2$ | —⟨⟩—$NH_2$ | 1 |
| 4 | $N(CH_3)_2$ | $N(CH_3)_2$ | —⟨⟩— | 1 |
| 5 | $N(CH_3)_2$ | $N(CH_3)_2$ | —⟨⟩—$N(CH_3)_2$ | 1 |
| 6 | $OCH_3$ | $OCH_3$ | —⟨⟩— | 1 |
| 7 | $OCH_3$ | $OCH_3$ | —⟨⟩—$OCH_3$ | 1 |
| 8 | $N(CH_3)_2$ | $N(CH_3)_2$ | —⟨⟩—Br | 2 |
| 9 | $N(CH_3)_2$ | $N(CH_3)_2$ | —⟨⟩— (Cl) | 2 |
| 10 | $N(CH_3)_2$ | $N(CH_3)_2$ | —⟨⟩—Cl | 2 |

TABLE A.—Continued

| | R₁ | R₂ | R₃ | n |
|---|---|---|---|---|
| 11 | N(CH₃)₂ | N(CH₃)₂ | -C₆H₃(Cl)(Cl)- (2,4-dichlorophenyl) | 2 |
| 12 | N(CH₃)₂ | N(CH₃)₂ | -C₆H₃(CH₃)(Cl)- | 2 |
| 13 | N(CH₃)₂ | N(CH₃)₂ | -C₆H₄-N(CH₃)₂ | 2 |
| 14 | OH | OH | pyridyl | 1 |
| 15 | OCH₃ | OCH₃ | pyridyl | 1 |
| 16 | OCH₃ | OCH₃ | quinolyl | 1 |
| 17 | N(CH₃)₂ | N(CH₃)₂ | -CH=CH-C₆H₄-N(CH₃)₂ | 1 |

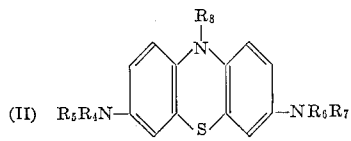

(II)   $R_5R_4N-\phantom{xxx}-NR_6R_7$

| | R₄ | R₅ | R₆ | R₇ | R₈ |
|---|---|---|---|---|---|
| 18 | CH₃ | CH₃ | CH₃ | CH₃ | H |
| 19 | CH₃ | CH₃ | CH₃ | CH₃ | -CO-C₆H₄-NO₂ |
| 20 | CH₃ | CH₃ | CH₃ | CH₃ | -CO-C₆H₄-Cl |
| 21 | CH₃ | CH₃ | CH₃ | CH₃ | -CO-C₆H₄-Cl |

A view of some synthesis methods for preparing the greater part of the dyestuffs of Table A is given in Table B hereinafter.

TABLE B

| Number of the compound of Table A: | Literature |
|---|---|
| 3 | FIAT 1313 I, p. 262. |
| 6 | BIOS Comp. 146/2/382/30. |
| 7 | J. Chem. Soc. (1954), p. 985. |
| 8 | British patent spec. 788,427. |
| 9 | British patent spec. 788,427. |
| 10 | British patent spec. 788,427. |
| 11 | British patent spec. 788,427. |
| 12 | British patent spec. 804,087. |
| 14 | Dutch patent spec. 84,532. |
| 15 | Dutch patent spec. 84,532. |
| 18 | Ber., 43 (1910), 201. |
| 19 | U.S. patent spec. 2,783,228. |
| 20 | U.S. patent spec. 2,784,186. |
| 21 | U.S. patent spec. 2,784,186. |

The compound 16 of Table A may be prepared as follows: 157 g. of quinoline-4-aldehyde, 216 g. of anisol and 605 cm.³ of acetic acid are mixed under cooling at 0 to 5° C. Whilst stirring, 260 cm.³ of sulphuric acid are dropwise added to the mixture at a temperature below 0° C. Stirring is continued for 1 hr. at 0–5° C., and for a further hour at room temperature. After standing overnight the reaction mixture is poured on 2 kg. of ice and the pH is brought from 9 to 10 with a 30% sodium hydroxide solution. The non-reacted starting product is eliminated by steam distillation, the residual oil is extracted with carbon tetrachloride and finally distilled. Boiling point of the obtained compound: 260–264° C. (0.7 mm. of Hg pressure).

For the manufacture of the electrophotographic material according to the present invention, a photoconductive layer containing at least one of the compounds according to one of the Formulae I or II on consisting essentially of at least one of the compounds according to one of the Formulae I or II, is applied to a suitable electrodconductive support.

Besides one or more of the compounds corresponding to one of the Formulae I and/or II, the photoconductive layers according to the present invention may contain still one or more photoconductive compounds with similar or different photo-electrical, mechanical and physical properties; moreover still other compounds may be present in the photoconductive layer, which confer the desired properties to the photoconductive layer and/or to the composition wherefrom this layer is formed.

In the manufacture of the electrophotographic material according to the present invention there is preferably used in intimate surface contact with the photoconductive layer an electroconductive backing member which is an electroconductive plate or sheet or an insulating plate or sheet which is provided with an electroconductive layer. By electroconductive plate, sheet or layer is understood a plate, sheet or layer the specific resistivity of which is lower than that of the photoconductive layer i.e. in general lower than $10^9$ ohm cm. Backings with a specific resistivity which is lower than $10^5$ ohm cm. are preferably used.

To serve as electroconductive backing, insulating plates and sheets must be provided with a conductive layer. Examples of suitable electroconductive materials are: aluminum, zinc, copper, tin, iron and lead. Suitable electroconductive layers are described in the Belgian patent specification 587,301.

A suitable insulating plate material is e.g. glass; insulating plates must be coated with a conductive layer, e.g. with a transparent silver, gold or stannous oxide layer deposited thereon e.g. by vacuum coating.

Suitable insulating sheet materials are e.g. synthetic macromolecular substances with a high specific resistivity, e.g. the polysulphonates described in United Kingdom patent specification 916,660, polyesters such as described in the U.K. patent specification 883,312, U.S. patent specification 3,028,364, and U.K. patent specification 901,605, polystyrene, polyethylene, cellulose esters etc. and paper sheets with a high specific resistivity. To serve as support for the photoconductive layer, insulating sheets must be provided with a conductive layer e.g. a thin metal sheet or foil or a layer comprising a metal powder dispersed in a binding agent (which should be used in as small as proportion as possible), or with a thin hydrophilic layer comprising a hydroscopic and/or antistatic compound and a hydrophilic binding agent. Suitable hygroscopic and/or antistatic compounds are described in the Belgian patent specification 587,301.

It has been found that very good results can be attained when using paper sheets provided with a layer of polymer substance in order to give the paper a smooth surface and in order to avoid penetration into the paper sheet of the organic liquid wherein the photoconductive substance is dissolved. This polymer layer, however, must not prevent the carrying off of the electrons from the exposed image areas during the irradiation. Paper sheets, which need no such polymer layer are paper sheets of the glassine type.

For obtaining a good adhesion between the electroconductive hydrophilic layer and the isolating hydrophobic sheets the polymer sheets can be provided with a suitable adhesive layer such as e.g. one of the adhesive layers described in said Belgian Patent 587,301. The application of photoconductive layers to a support is likewise described in said Belgian patent specification 587,301.

The photoconductive layer of an electrophotographic material according to the invention need not consist entirely of one or more compounds according to the given general formulae but in general such compounds should be used in an amount of at least 80% by weight of the total amount of photoconductive compounds present in the photoconductive layer. Preferably the photoconductive layer consists for more than 95% by weight of one or more photoconductive compounds corresponding to one of the above-mentioned formulae.

If, however, the photoconductive layer is composed on the base of a photoconductive polymer, one or more of the compounds according to the said general formulae can in that case be added as a sensitizer (say in an amount of 0.1 to 5%) to the photoconductive polymer. In such a case the photoconductive layer may be self-sustaining and it need not be united to a backing. The invention includes such a photoconductive material.

In the manufacture of photoconductive layers according to the present invention, electrically insulating binding agents can be used such as described in the U.K. patent specifications 964,876 and 964,878. Further additives can be still used which are well known in the coating art such as for instance pigments, compounds which influence glossing and viscosity and compounds which counteract ageing and oxidation, or which influence the heat stability of the layer. When choosing these additives, preference is given to those which do not or do not appreciably reduce the dark-resistivity of the photoconductive layer.

A suitable thickness of the layers can be determined by the requirements of each separate case. In general, good results are attained with electrophotographic layers with a thickness from 1 to 20μ and the thickness is preferably between 3 and 10μ.

Finally, according to the present invention compounds which cause an increase of the general sensitivity and/or cause an increase of the sensitivity to electromagnetic rays from a particular part of the spectrum can also be present in the photoconductive layers, irrespective of whether or not such sensitizing compounds themselves have photoconductive properties.

The general sensitivity and/or the sensitivity to electromagnetic rays from the visible part of the spectrum can be increased by adding to the photoconductive layer one or more of the compounds described in the Belgian patent specification 588,050 from classes A to T inclusive, preferably arylmethane dye salts, particular representatives of which are mentioned in the classes A–C, one or more of the compounds described in the Belgian patent specification 594,974, filed September 13, 1960, and/or one or more of the compounds described in the Belgian patent specification 595,696, filed October 4, 1960. Preferably the proportion in which such compounds are used is from 0.1 to 5% in respect of the amount of the compound(s) according to the above-mentioned formulae used as photoconductor. As very suited sensitizers cyclated aryl methane dyestuffs such as e.g. Rhodamine B (Colour Index 45,170) are cited.

The electrophotographic materials according to the present invention can be used in any of the known electrophotographic techniques based on the formation of an electrostatic charge image in or on a photoconductive layer.

Thus, the photoconductive layer may be electrostatically charged according to one of the methods described in the U.K. patent specification 964,876. Exposure, transfer of the image, if any, development and fixation may also be as described in said U.K. patent specification 964,876.

The present invention is not limited to any particular mode of use of the new electrophotographic materials, and the exposure technique, the charging method, the transfer (if any), the developing method, and the fixing method as well as the materials used in these mehtods can be adapted to the requirements of the selected technique.

Electrophotographic materials according to the present invention can be applied in reproducing techniques wherein different kinds of radiations, electromagnetic radiations as well as nuclear radiations are used. For this reason, it should be pointed out that although materials according to the invention are mainly intended for use in connection with methods comprising an exposure, the term "electrophotography" wherever appearing in the description and the claims, must be broadly understood and comprises both xerography and xeroradiography.

The following examples illustrates the present invention without limiting, however, the scope thereto.

*Example 1*

A 90 g./sq. m. paper support covered with an aluminum sheet of a thickness of 8μ is coated with a layer from the following solution:

| | |
|---|---|
| Compound 9 of Table A, g. | 5 |
| Dimethylformamide, cm.$^3$ | 70 |
| Butvar B 90 (trade name for a polyvinylbutyral resin manufactured by Shawinigan Resins Corporation, Springfield, Mass., U.S.A., g. | 5 |
| Ethanol, cm.$^3$ | 30 |

The dried layer has a thickness of 8μ. The electrophotographic material thus obtained is charged and exposed for 2 seconds through a diapositive with a 100 watt lamp at a distance of 10 cm. The formed latent image is developed with a mixture of 100 g. of iron filings and 5 g. of Toner P 648 (trade name for a developing dyestuff manufactured by General Photo Products Co., Inc., Chatham, N.J., U.S.A.). The vigorous black image obtained on an almost completely colourless background is finally fixed on exposing it during a few seconds to carbon tetrachloride vapors.

*Example 2*

A paper as in Example 1 is coated with a layer from the following solution:

| | |
|---|---|
| Compound 8 of Table A, g. | 5 |
| Dimethylformamide, cm.$^3$ | 70 |
| Butvar B 90 (trade name), g. | 5 |
| Tetrachlorophthalic anhydride, mg. | 10 |

After drying, this material is charged electrostatically, image-wise exposed for 1 second with a 25 watt lamp at a distance of 10 cm. and further developed and fixed as in Example 1.

*Example 3*

A 90 g./sq. m. paper provided with a first layer of gelatine is coated with a second layer from the following solution:

| | |
|---|---|
| Compound 1 of Table A, g. | 5 |
| Hostalit CAM (registered trademark for a terpolymer of vinylchloride, vinylacetate and maleic anhydride, manufactured by Farbwerke Hoechst A.G., Frankfurt am Main-Hoechst, Germany), g. | 5 |
| Rhodamine G (C.I. 45, 150), mg. | 12 |
| Methylene chloride, cm.$^3$ | 100 |

The dried layer has a thickness of 7μ. The light-sensitive material thus obtained is charged electrostatically and image-wise exposed for 1.5 seconds through a transparent original with a 25 watt lamp at a distance of 10 cm. Development and fixation are carried out as in Example 1. For a reflectographic printing an exposure time of 4 seconds is required with a 100 watt lamp at a distance of 10 cm.

*Example 4*

A 60 g./sq. m. paper support covered with an aluminum sheet of a thickness of 8μ is coated with a layer from the following solution:

| | |
|---|---|
| Compound 2 of Table A, g. | 5 |
| Formvar 15-95E (trade name for polyvinylformal, manufactured by Shawinigan Resins Corporation, Springfield, Mass., U.S.A.), g. | 5 |
| Rhodamine B (C.I. 45, 170), mg. | 10 |
| Methylene chloride, cm.³ | 100 |

The dried layer has a thickness of 8μ. The light-sensitive material thus obtained is charged with a negative electrostatic charge and exposed for 3 seconds through a transparent original with a 25 watt lamp at a distance of 10 cm. Development and fixation are carried out as in Example 1.

*Example 5*

An aluminum sheet is coated with a layer from the following solution:

| | |
|---|---|
| Leuco malachite green (compound 4 of Table A), g. | 5 |
| Acetone, cm.³ | 150 |
| Hostalit CAM (registered trademark), g. | 5 |
| Rhodamine B (C.I. 45,170), g. | 0.01 |
| Benzotriazole, g. | 0.1 |

The electrophotographic material thus obtained is dried, and charged with a negative corona at 6000 volts. This electrophotographic material is exposed for 3 seconds through a negative with a 25 watt lamp at a distance of 10 cm. Development and fixation are carried out as in Example 1.

*Example 6*

Onto a glass plate provided with a thin layer of conductive tin oxide having a resistance of 10 ohm mc. is coated a layer from the following solution:

| | |
|---|---|
| Poly(N-vinyl carbazole) prepared in the presence of sulphuric acid as described in our U.S. patent application Serial No. 11, 128, g. | 5 |
| Compound 4 of Table A, g. | 5 |
| Methylene chloride, cm.³ | 100 |

The dried layer has a thickness of 7μ. The electrophotographic material thus obtained is charged with a corona and exposed for 3 seconds through an original with a 100 watt lamp at a distance of 10 cm. After development and fixation as in Example 1, a vigorous copy of the original is obtained on a practically colourless background.

*Example 7*

A 60 g./sq. m. paper support is coated with a layer from a suspension consisting of 2 parts of Kontaktargan (trade name for an aluminum powder manufactured by Eckart-Werke, Furth, Germany), 1 part of gelatin and 100 parts of water.

Hereupon is coated a layer from the following solution:

| | |
|---|---|
| Compound 5 of Table A, g. | 10 |
| Poly(N-propenyl carbazole) prepared according to the method described in our U.S. patent application Serial No. 11,128, g. | 10 |
| Methylene chloride, cm.³ | 100 |

The layer is dried and the material thus obtained is charged electrostatically. For a 4 times linear enlargement of a microfilm image an exposure time of 2 minutes is required with a 75 watt lamp.

The obtained material is finally developed and fixed as in Example 1.

*Example 8*

A 90 g./sq. m. baryta coated paper is dip-coated with a layer from the following solution:

| | |
|---|---|
| Hostalit CAM (registered trademark), g. | 5 |
| Acetone, cm.³ | 50 |
| Compound 17 of Table A, g. | 5 |
| Methylene chloride, cm.³ | 50 |

This layer is dried by heat. After charging with a corona the material thus obtained is exposed for 1.5 seconds according to the reflex method with a 100 watt lamp at a distance of 25 cm. After development of the electrostatic image formed, the powder image obtained may be transferred onto another support. A very contrasty copy is obtained after fixation by heat.

*Example 9*

A 10% solution of Hostalit CAM (trademark for copoly (vinyl chloride/vinyl acetate/maleic anhydride) (85/14/1) marketed by Farbwerke Hoechst A.G., Frankfurt am Main, Hoechst, Germany) in methylene chloride is mixed with a 10% solution of compound 19 in methylene chloride.

The mixture is applied to an aluminum sheet in such a way that 1 litre covers 20 sq. m. Then the layer applied is dried by means of air current of 45° C.

The light-sensitive material thus obtained is charged with a negative corona (6000 v.) and exposed for 40 seconds in contact with a line original by means of a 100 watt lamp placed at a distance of 10 cm. The formed latent image is developed with a triboelectrically charged powder developer and finally fixed by means of an infrared lamp.

What we claim is:

1. A method of forming developed electrostatic images comprising the steps of (1) exposing to a pattern of light a uniformly, electrostatically charged photoconductive insulating layer on a support which comprises (a) a polymeric binder, and dispersed therein (b) a leucobase of a dye selected from the group consisting of diaryl methane dyes and triaryl methane dyes; and (2) developing the electrostatic charge image.

2. Electrophotographic material comprising a photoconductive layer and an electroconductive backing member in intimate surface contact therewith, said photoconductive layer consisting essentially of at least one organic compound corresponding to one of the following general formulae:

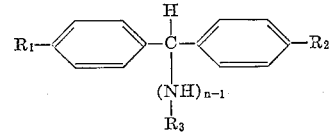

and

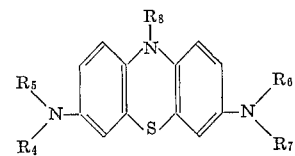

wherein:
each of $R_1$ and $R_2$ represents a member selected from the group consisting of hydroxyl, an alkoxy radical and an amino group,
$R_3$ is a member selected from the group consisting of hydrogen, hydroxyl, a monocyclic aryl radical and a heterocyclic radical containing a single hetero atom,
$n$ is an integer from 1 to 2, each of $R_4$, $R_5$, $R_6$ and $R_7$ represents a member selected from the group consisting of hydrogen and lower alkyl, and $R_8$ is a member selected from the group consisting of hydrogen and a benzoyl group.

3. The electrophotographic material of claim 2, wherein said organic compound consitutes at least about 80% of the total weight of photoconductive substances present in said photoconductive layer.

4. The electrophotographic material of claim 3, wherein said organic compound constitutes not less than 95% of the total weight of photoconductive substances present in said photoconductive layer.

5. In a method of reproduction wherein an electrostatic charge pattern is created on a photoconductive insulating layer and which includes the steps of electrostatically charging and image-wise exposing said photoconductive insulating layer, the improvement characterized in that said layer comprises a leucobase selected from the group consisting of leucobases of polyarylmethane dye salts and leucobases of thiazine dye salts.

6. A method as in claim 5, wherein said leucobase of a polyarylmethane dye salt is a compound having the following formula:

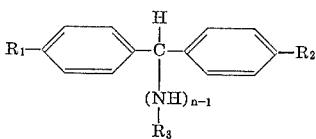

wherein: each of $R_1$ and $R_2$ represent a member selected from the group consisting of hydroxyl, an alkoxy radical and an amino group, $R_3$ is a member selected from the group consisting of hydrogen, hydroxyl, a monocyclic aryl radical and a heterocyclic radical containing a single hetero atom, and $n$ is an integer from 1 to 2.

7. A method as in claim 5, wherein said leucobase of a thiazine dye salt is a compound having the following formula:

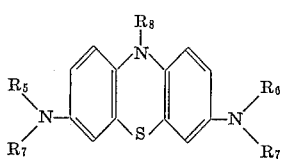

wherein:

each of $R_4$, $R_5$, $R_6$ and $R_7$ represents a member selected from the group consisting of hydrogen and lower alkyl, and $R_8$ is a member selected from the group consisting of hydrogen and a benzoyl group.

8. The method of claim 5, which includes the step of reproducing a visible image from the electrostatic charge pattern created on said photoconductive insulating layer.

9. The method of claim 5, wherein said leucobase constitutes at least about 80% of the total weight of photoconductive substances present in said photoconductive insulating layer.

10. The method of claim 5, wherein said leucobase constitutes not less than about 95% by weight of the total weight of photoconductive substances present in said photoconductive insulating layer.

11. In a method of recording including the step of recording a pattern of electrostatic charges on a photoconductive insulating layer, the improvement characterized in that said layer comprises a compound corresponding to one of the following general formulae:

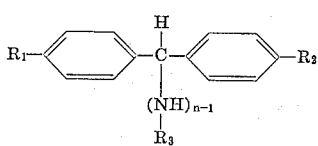

and

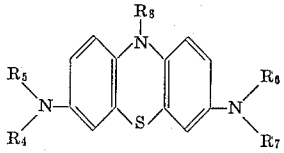

wherein:

each of $R_1$ and $R_2$ represents a member selected from the group consisting of hydroxyl, an alkoxy radical and an amino group, $R_3$ is a member selected from the group consisting of hydrogen, hydroxyl, a monocyclic aryl radical and a heterocyclic radical containing a single hetero atom, $n$ is an integer from 1 to 2, each of $R_4$, $R_5$, $R_6$ and $R_7$ represents a member selected from the group consisting of hydrogen and lower alkyl, and $R_8$ is a member selected from the group consisting of hydrogen and a benzoyl group.

12. Electrophotographic material according to claim 2, wherein the photoconductive layer contains an aryl methane dye salt as sensitizing agent.

13. Electrophotographic material according to claim 2, wherein the photoconductive layer contains a cyclated aryl methane dye as sensitizing agent.

14. Electrophotographic material according to claim 12, wherein the aryl methane dye salt is present in an amount of from 0.1 to 5% by weight relative to the amount of leucobase(s) present.

15. Electrophotographic material according to claim 13, wherein the cyclated aryl methane dye is present in an amount of from 0.1 to 5% by weight relative to the amount of leucobase(s) present.

16. A method of reproduction as in claim 5, wherein the photoconductive layer also comprises an aryl methane dye salt as sensitizing agent.

17. A method of reproduction as in claim 5, wherein the photoconductive layer also comprises a cyclated aryl methane dye as sensitizing agent.

18. A method of reproduction as in claim 16, wherein the aryl methane dye salt is present in an amount of from 0.1 to 5% by weight relative to the amount of leucobase(s) present.

19. A method of reproduction as in claim 17, wherein the cyclated aryl methane dye is present in an amount of from 0.1 to 5% by weight relative to the amount of leucobase(s) present.

References Cited by the Examiner

UNITED STATES PATENTS

| 3,112,197 | 11/1963 | Neugebauer et al. | 96—1 |
| 3,155,503 | 11/1964 | Cassiers et al. | 96—1 |
| 3,159,483 | 12/1964 | Behmenburg et al. | 96—1 |

FOREIGN PATENTS

| 562,336 | 5/1958 | Belgium. |
| 562,337 | 5/1958 | Belgium. |

NORMAN G. TORCHIN, *Primary Examiner.*

ARTHUR LIBERMAN, J. T. BROWN,

*Assistant Examiners.*